United States Patent
Sato et al.

(10) Patent No.: US 8,570,691 B2
(45) Date of Patent: Oct. 29, 2013

(54) TMR SENSOR FILM USING A TANTALUM INSERTION LAYER AND SYSTEMS THEREOF

(75) Inventors: Masashige Sato, Kanagawa (JP); Kojiro Komagaki, Kanagawa (JP)

(73) Assignee: HGST Netherlands B.V., Amsterdamn (NL)

( * ) Notice: Subject to any disclaimer, the term of this patent is extended or adjusted under 35 U.S.C. 154(b) by 104 days.

(21) Appl. No.: 13/082,098

(22) Filed: Apr. 7, 2011

(65) Prior Publication Data

US 2012/0257298 A1    Oct. 11, 2012

(51) Int. Cl.
 G11B 5/33    (2006.01)
 G11B 5/127    (2006.01)

(52) U.S. Cl.
 USPC .................................. 360/324.2; 360/324.11

(58) Field of Classification Search
 USPC .......................... 360/110, 324, 324.11, 324.2
 See application file for complete search history.

(56) References Cited

U.S. PATENT DOCUMENTS

| | | | |
|---|---|---|---|
| 6,731,478 B2 | 5/2004 | Nakamoto et al. | |
| 7,226,796 B2 | 6/2007 | Pietambaram et al. | |
| 7,241,631 B2 | 7/2007 | Huai et al. | |
| 7,593,195 B2 | 9/2009 | Fukuzawa et al. | |
| 7,602,033 B2 | 10/2009 | Zhao et al. | |
| 7,633,796 B2 | 12/2009 | Yamane et al. | |
| 7,663,131 B2 | 2/2010 | Horng et al. | |
| 7,672,088 B2 | 3/2010 | Zhang et al. | |
| 7,692,902 B2 | 4/2010 | Amano et al. | |
| 2002/0041473 A1* | 4/2002 | Hoshiya et al. | 360/324.11 |
| 2002/0044398 A1 | 4/2002 | Sasaki et al. | |
| 2003/0011944 A1* | 1/2003 | Hosomi | 360/324.1 |
| 2006/0227467 A1* | 10/2006 | Ide et al. | 360/324.11 |
| 2007/0139827 A1* | 6/2007 | Gao et al. | 360/324.2 |
| 2008/0144233 A1* | 6/2008 | Amano et al. | 360/324.2 |
| 2008/0239589 A1* | 10/2008 | Guo et al. | 360/324.12 |

(Continued)

FOREIGN PATENT DOCUMENTS

| | | |
|---|---|---|
| JP | 04082711 A2 | 3/1992 |
| JP | 2004-259280 | 9/2004 |

OTHER PUBLICATIONS

Cardoso et al., "Influence of Ta Antidiffusion Barriers on the Thermal Stability of Tunnel Junctions," Applied Physics Letters, Jun. 2000, vol. 76, Issue 25, pp. 3792-3794 (abstract only).

(Continued)

*Primary Examiner* — Wayne Young
*Assistant Examiner* — Adam B Dravininkas
(74) *Attorney, Agent, or Firm* — Zilka-Kotab, PC

(57) ABSTRACT

In one embodiment, a tunnel magnetoresistance (TMR) head includes a lead layer above a substrate, a seed layer above the lead layer, an antiferromagnetic (AFM) layer above the seed layer, a first ferromagnetic layer above the AFM layer, a second ferromagnetic layer above the first ferromagnetic layer, a coupling layer between the first and second ferromagnetic layers, the coupling layer causing a magnetization of the second ferromagnetic layer to be coupled to a magnetization of the first ferromagnetic layer, a fixed layer above the second ferromagnetic layer, an insertion layer adjacent the fixed layer or in the fixed layer, a barrier layer above the fixed layer, a free layer above the barrier layer, and a cap layer above the free layer. In another embodiment, the insertion layer is from about 0.05 nm to 0.3 nm in thickness and includes Ta, Ti, Hf, and/or Zr, and the free layer includes CoFeB.

14 Claims, 7 Drawing Sheets

(56) References Cited

U.S. PATENT DOCUMENTS

| | | | |
|---|---|---|---|
| 2008/0266725 A1* | 10/2008 | Shatz et al. | 360/324.11 |
| 2008/0316657 A1* | 12/2008 | Zhang et al. | 360/324.11 |
| 2009/0165288 A1 | 7/2009 | Wang et al. | |
| 2009/0213503 A1* | 8/2009 | Sun et al. | 360/324.2 |
| 2009/0257152 A1* | 10/2009 | Lee et al. | 360/324.11 |
| 2010/0091416 A1* | 4/2010 | Katada et al. | 360/324.11 |

OTHER PUBLICATIONS

Choi et al., "Effect of Ta Getter On The Quality of MgO Tunnel Barrier in the polycrystalline CoFeB/MgO/CoFeB Magnetic Tunnel Junction," Applied Physics Letters, Jan. 2007, vol. 90, Issue 1, pp. 012505-12505-3 (abstract only).

Kyung et al., "Microstructure and Electrical Properties of Magnetic Tunneling Junction: NiFe/Co/Ta/Al-oxide/Co," Materials Science and Engineering B., vol. 90, Issues 1-2, Mar. 7, 2002, pp. 13-15 (abstract only).

Hayakawa et al., "Dependence of Giant Tunnel Magnetoresistance of Sputtered CoFeB/MgO/CoFeB Magnetic Tunnel Junctions on MgO Barrier Thickness and Annealing Temperature," Japanese Journal of Applied Physics, vol. 44, 2005, pp. L587-L589 (abstract only).

* cited by examiner

TMR SENSOR FILM USING A TANTALUM INSERTION LAYER AND SYSTEMS THEREOF

FIELD OF THE INVENTION

The present invention relates to magnetic reproducing devices, and more specifically, to a tunnel magnetoresistance (TMR) head for reading data from magnetic media, the head having a tantalum insertion layer therein.

BACKGROUND OF THE INVENTION

Magnetic heads which are used in magnetic disk devices are typically provided with a reproduction head for reading data recorded on one or more magnetic recording media therein. A magnetoresistance effect film that has a resistance value that varies in response to magnetization signals recorded on the recording media is used in the reproduction head to read signals from the magnetic media. The magnetoresistance effect film includes a magnetization fixed layer in which the magnetization direction is fixed in one direction, and a magnetization free layer in which the magnetization direction varies freely, and may be affected by a magnetic field emanating from the medium. Changes in the magnetoresistance produced by changes in the relative angles of the respective magnetization directions of the magnetization free layer and the magnetization fixed layer due to the action of the medium magnetization signals are detected in order to read the signals. This means that a magnetoresistance effect film exhibiting large changes in magnetoresistance and an element provided therewith are needed in order to improve the reading performance of a magnetic reproduction head.

The magnetoresistance effect element may be a current-in-plane (CIP) element in which current flows in the plane of the magnetoresistance effect film, or a current-perpendicular-to-plane (CPP) element in which the current flows perpendicular to the film surface. FIG. 1 shows an example of the film structure 100 of a bottom-type tunnel magnetoresistance (TMR) effect element. This magnetoresistance effect element includes an underlayer 111, an antiferromagnetic layer 112, a magnetization fixed layer 113, a tunnel barrier layer 114, a magnetization free layer 115, and a cap layer 116. These layers taken together form a tunnel magnetoresistance effect film 118 and are formed between a lower shield layer 110 and an upper shield layer 117.

It has been reported that tunnel magnetoresistance effect elements employing MgO as the tunnel barrier layer exhibit a very large magnetoresistance change ratio (TMR ratio), as disclosed in Japanese Patent No. 4,082,711, and a high TMR ratio exceeding 200% is demonstrated in particular by CoFeB/MgO/CoFeB-tunnel magnetoresistive elements employing a CoFeB magnetic layer and an MgO barrier layer, which are produced by sputtering and are widely used in the industry, as disclosed in Japanese Patent Application Publication No. 2004-259280.

One reason why a high TMR ratio is demonstrated by CoFeB/MgO/CoFeB-tunnel magnetoresistive elements is believed to be because immediately after film formation, the amorphous CoFeB layer undergoes body-centered cubic (bcc) (001)-orientation crystallization during heat treatment at the tunnel barrier layer which includes (001)-orientation crystals, as described in J. Hayakawa et al., Jpn. J. Appl. Phys., 44 L587 (2005).

In order to achieve a high TMR ratio, i.e., high reproduction output, in a TMR element which is used in a reproduction head, it is very effective to use an (001)-orientation crystalline insulating layer as the tunnel barrier layer, and to use CoFeB layers for the magnetization fixed layer and the magnetization free layer.

Furthermore, the magnetization fixed layer 113 typically includes a first magnetization fixed layer, a nonmagnetic coupling layer, and a second magnetization fixed layer. Ru is typically used for the nonmagnetic coupling layer, and the first magnetization fixed layer and the second magnetization fixed layer are antiferromagnetically coupled by adjusting the thickness of the nonmagnetic coupling layer. By adopting this kind of structure, the amount of magnetic field leakage from the fixed layers may be adjusted, while the resistance of the fixed layers to external magnetic fields may be increased.

The bit size on recording media has become smaller and smaller in recent years as the recording density of hard disk drives (HDDs) has increased. Therefore, increasing the output of the reproduction head and improving the signal-to-noise ratio (SNR) in order to more accurately read the magnetic signals which are recorded on the recording media would be beneficial. The manner in which the (001)-oriented CoFeB/MgO/CoFeB structure is formed may also be useful for improving the output of the reproduction head.

SUMMARY OF THE INVENTION

In one embodiment, a tunnel magnetoresistance (TMR) head includes a lead layer above a substrate, a seed layer above the lead layer, an antiferromagnetic (AFM) layer above the seed layer, a first ferromagnetic layer above the AFM layer, a second ferromagnetic layer above the first ferromagnetic layer, a coupling layer between the first and second ferromagnetic layers, the coupling layer causing a magnetization of the second ferromagnetic layer to be coupled to a magnetization of the first ferromagnetic layer, a fixed layer above the second ferromagnetic layer, an insertion layer adjacent the fixed layer or in the fixed layer, a barrier layer above the fixed layer, a free layer above the barrier layer, and a cap layer above the free layer.

In another embodiment, a TMR head includes a lead layer above a substrate, the lead layer acting as a first terminal, an AFM layer above the lead layer, a ferromagnetic layer above the AFM layer, a fixed layer above the ferromagnetic layer, a coupling layer between the ferromagnetic layer and the fixed layer, the coupling layer causing a magnetization of the fixed layer to be coupled to a magnetization of the ferromagnetic layer, an insertion layer adjacent the fixed layer or in the fixed layer, the insertion layer having a thickness in a range from about 0.05 nm to about 0.3 nm and including at least one of: Ta, Ti, Hf, and Zr, a barrier layer above the fixed layer, a free layer above the barrier layer, the free layer including CoFeB, and a cap layer above the free layer, the cap layer acting as a second terminal.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a tunnel magnetoresistance (TMR) head includes a lead layer above a substrate, a seed layer above the lead layer, an antiferromagnetic (AFM) layer above the seed layer, a first ferromagnetic layer above the AFM layer, a second ferromagnetic layer above the first ferromagnetic layer, a coupling layer between the first and second ferromagnetic layers, the coupling layer causing a magnetization of the second ferromagnetic layer to be coupled to a magnetization of the first ferromagnetic layer, a fixed layer above the second ferromagnetic layer, an insertion layer adjacent the fixed layer or in the fixed layer, a barrier layer above the fixed layer, a free layer above the barrier layer, and a cap layer above the free layer.

In another general embodiment, a TMR head includes a lead layer above a substrate, the lead layer acting as a first terminal, an AFM layer above the lead layer, a ferromagnetic layer above the AFM layer, a fixed layer above the ferromagnetic layer, a coupling layer between the ferromagnetic layer and the fixed layer, the coupling layer causing a magnetization of the fixed layer to be coupled to a magnetization of the ferromagnetic layer, an insertion layer adjacent the fixed layer or in the fixed layer, the insertion layer having a thickness in a range from about 0.05 nm to about 0.3 nm and including at least one of: Ta, Ti, Hf, and Zr, a barrier layer above the fixed layer, a free layer above the barrier layer, the free layer including CoFeB, and a cap layer above the free layer, the cap layer acting as a second terminal.

Figure 1:
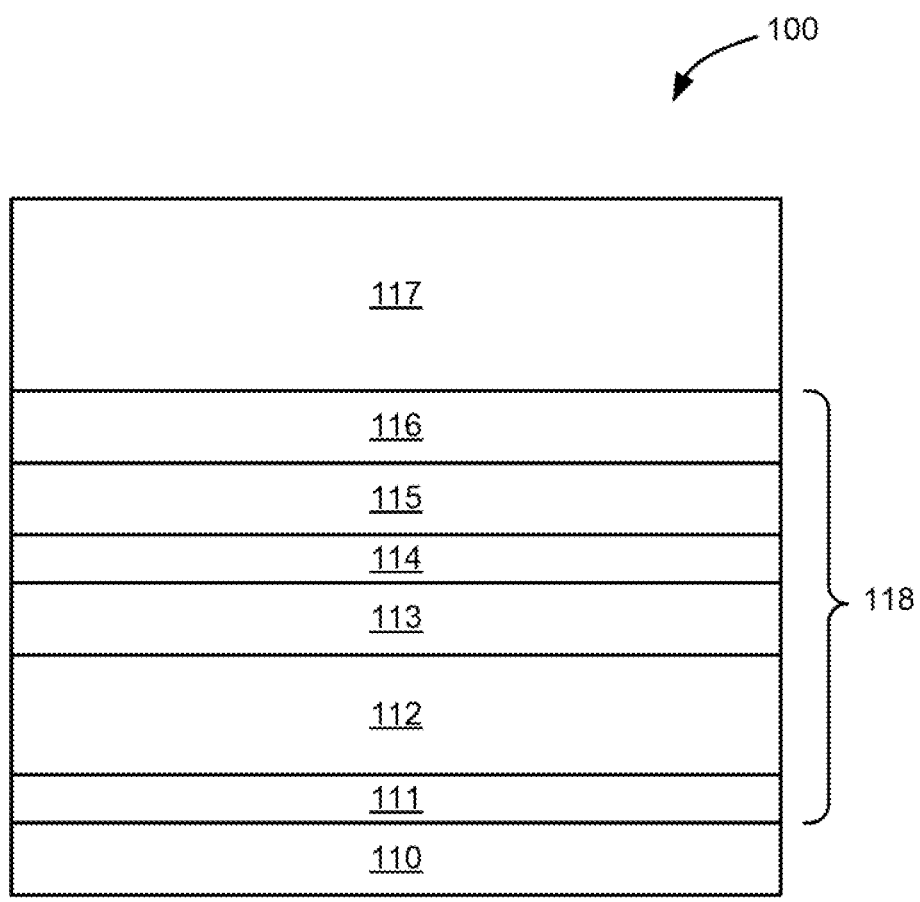
FIG. 1 is a schematic diagram showing a film structure of a bottom-type tunnel magnetoresistance (TMR) effect element, according to the prior art.
Figure 2:
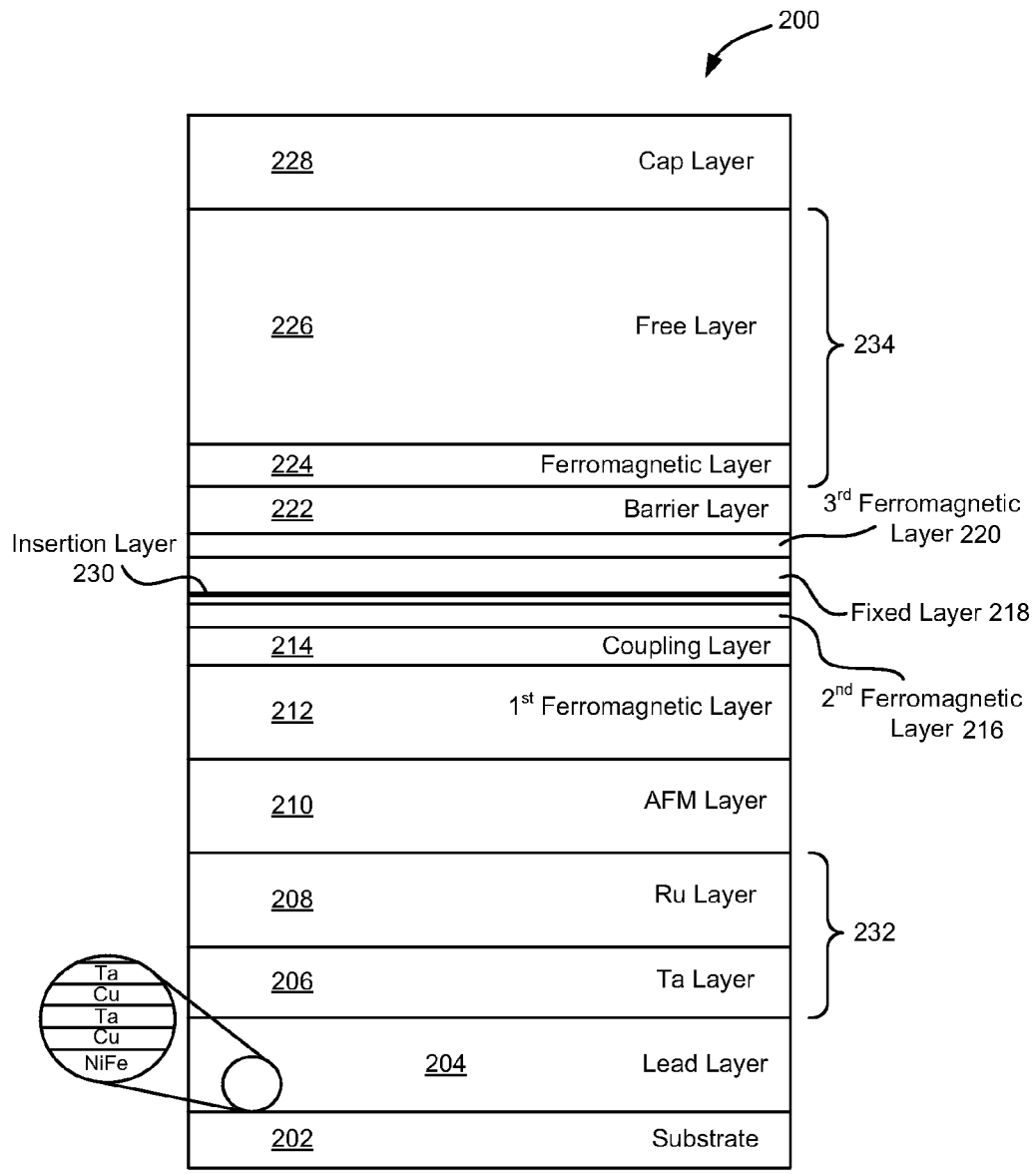
FIG. 2 shows a structure of a TMR film, according to one embodiment.

According to one exemplary embodiment, a TMR film 200 may have a structure as shown in FIG. 2. The TMR film 200, in the exemplary embodiment, was formed using a magnetron sputtering apparatus. However, any formation technique and device may be used to form any and/or all layers of the TMR film 200 as would be understood by one of skill in the art upon reading the present descriptions, such as sputtering, plating, growing, plasma enhanced vapor deposition (PEVD), chemical vapor deposition (CVD), etc. A structure of the TMR film 200 is shown in FIG. 2, according to one embodiment. Of course, other structures are possible, and may include more or less layers than those shown in FIG. 2, such as shields, insulating layers, etc.

According to one embodiment, the TMR sensor film 200 may include a structure for a magnetization fixed layer that comprises a ferromagnetic layer 216, a coupling layer 214, and a fixed layer 218. A very thin insertion layer 230, comprising at least one of Ta, Ti, Hf, Zr, etc., may be inserted at the bottom interface of the fixed layer 218, such as directly above the coupling layer 214. If the fixed layer 218 is a multiple layer structure comprising a crystallized lower ferromagnetic layer 216 (such as NiFe, CoFe, etc.) and an upper layer 218 of CoFeB and/or CoFeHf, the insertion layer 230 may be disposed above the crystallized ferromagnetic layer 216, as shown in FIG. 2.

In accordance with the above-described structure, the amorphous properties of the CoFeB/CoFeHf fixed layer 218 positioned above or around the insertion layer 230 may be improved, and as a result the crystallinity of a barrier layer 222 (such as MgO, $Al_2O_3$, etc.) and the (001)-orientation at the interface after heat treatment may be improved, so a high MR ratio may be achieved, in some embodiments.

According to some approaches, an insertion layer 230 comprising Ta is inserted during formation on a crystalline structure (the coupling layer 214 and/or the second ferromagnetic layer 216) which assumes a hexagonal-close packed (hcp) Ru crystal structure, possibly comprising the coupling layer 214. The amorphous properties of the CoFeB/CoFeHf fixed layer 218 positioned thereon may be improved, e.g., it is normally the case that if an amorphous material is grown on a crystalline material, the initial growth layer is affected by the crystal so it does not become completely amorphous and has a small degree of regularity (crystallinity). However, in present embodiments, the amorphous CoFeB/CoFeHf fixed layer 218 may be grown without being affected by the hcp or fcc crystals below.

As a result, the crystallinity and (001)-orientation of the interface after heat treatment of the barrier layer 222 may be improved, and a high MR ratio may be achieved. This means that it is possible to realize a high-output reproduction head using the techniques and structures described herein, according to various embodiments.

A silicon (Si) wafer may be used as the substrate 202, in one approach, but any suitable material may be used as would be apparent to one of skill in the art upon reading the present descriptions. A ferromagnetic layer 216 may comprise CoFe, NiFe, etc., and may have a thickness in a range from about 0.2 nm to about 1.0 nm, such as about 0.5 nm, in one approach. The ferromagnetic layer 216 may be formed on a coupling layer 214 in order to maintain exchange coupling through the coupling layer 214. In some embodiments, the coupling layer 214 may be an AFM coupling layer, an exchange coupling layer, an antiparallel coupling (APC) layer, etc., or any other type of coupling layer as would be understood by one of skill upon reading the present descriptions.

Furthermore, another ferromagnetic layer 220 may comprise CoFe, NiFe, etc., and may have a thickness in a range from about 0.2 nm to about 1.0 nm, such as about 0.5 nm in one approach, and may be formed below a barrier layer 222, which may comprise MgO, $Al_2O_3$, or any other suitable tunnel barrier material, in various approaches, in order to suppress oxidation of the interface between the barrier layer 222 and a fixed layer 218. According to one approach, a lead layer 204 may comprise NiFe or the like with multiple layers of Cu and Ta formed thereon. The lead layer 204 may comprise a terminal having a sheet resistance of about 0.5 Ω/sq±50%, and may have a sheet thickness in a range from about 50 nm to about 200 nm, such as about 80 nm, in one approach. A cap layer 228 may form a second terminal on an opposite side of the TMR film 200, the second terminal having a sheet resistance of about 1.5 Ω/sq±50%, in one approach, and may be formed of any suitable material as would be known to one of skill in the art.

It is noted that although an insertion layer 230 is shown positioned at a lower portion of the fixed layer 218, it may be formed at any position in ferromagnetic layer 216, in the fixed layer 218, or in ferromagnetic layer 220, according to various embodiments. For example, the insertion layer 218 may be adjacent to the fixed layer 218 or in the fixed layer 218.

In one exemplary embodiment, and not meant to be limiting in any manner, materials of construction and thicknesses of each layer were as follows: lead layer 204 (NiFe, Cu, Ta), 80 nm; seed layer structure 232 comprising Ta layer 206, 1.5 nm, and Ru layer 208, 2 nm; antiferromagnetic (AFM) layer 210 (MnIr), 5 nm; first ferromagnetic layer 212 (CoFe), 2 nm; coupling layer 214 (Ru), 0.8 nm; second ferromagnetic layer 216 (CoFe), 0.5 nm; insertion layer 230 (Ta), 0.1 nm; fixed layer 218 (CoFeB), 1 nm; third ferromagnetic layer 220 (CoFe), 0.5 nm; barrier layer 222 (MgO), varying thicknesses; free layer structure 234 comprising fourth ferromagnetic layer 224 (CoFe), 0.9 nm, and free layer 226 (CoFeB), 5 nm. Of course, other materials and thicknesses may be used for any of the above described layers according to various embodiments, as would be understood by one of skill in the art upon reading the present descriptions.

The TMR film 200 may be subjected to heat treatment in a magnetic field using a heat treating furnace. In one exemplary embodiment, the magnetic flux density was 5 T, the heat treatment temperature was 260° C., and the treatment time was 4 hours. The electrical characteristics of the TMR film 200 produced were evaluated using a TMR in-plane measurement method. It should be noted that the barrier layer 222 was formed with a wafer in-plane distribution in order to evaluate the characteristics against a plurality of resistance areas (RA).

Figure 3:
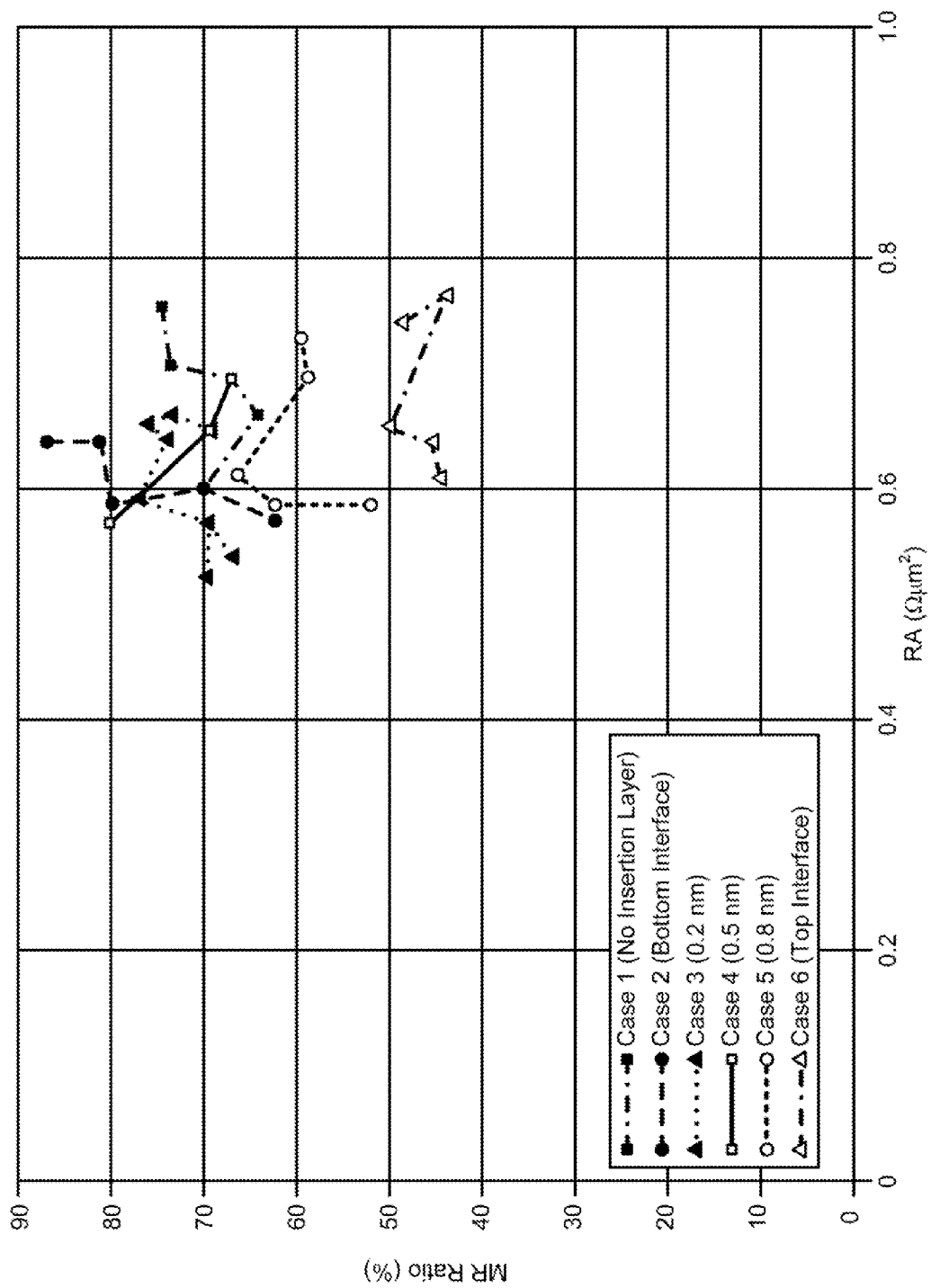
FIG. 3 shows a relationship between the resistance area (RA) and the change ratio MR when a 0.1 nm Ta insertion layer was introduced into the fixed layer of a TMR film, according to one embodiment.

FIG. 3 shows a relationship between the resistance area (RA) and the change ratio MR when a 0.1 nm Ta insertion layer (230, FIG. 2) was introduced into the fixed layer (218, FIG. 2). Case 1 to Case 6 (FIG. 3) each correspond to TMR films in which the insertion position of the Ta insertion layer from the second ferromagnetic layer (216, FIG. 2) is varied. A 5-point measurement result is plotted in the wafer in-plane for each TMR film as shown in FIG. 3. The RA had a width on the order of approximately 0.1 Ωμm$^2$ because of the presence of the film thickness distribution in the MgO barrier. When the Ta insertion layer was not inserted, an MR ratio of around 70% was obtained, but in contrast to this, the MR ratio increased by virtue of the Ta insertion layer's position. It is clear from the exemplary embodiment that a higher MR was demonstrated due to the insertion position as compared to the case where there was no insertion layer.

Figure 4:
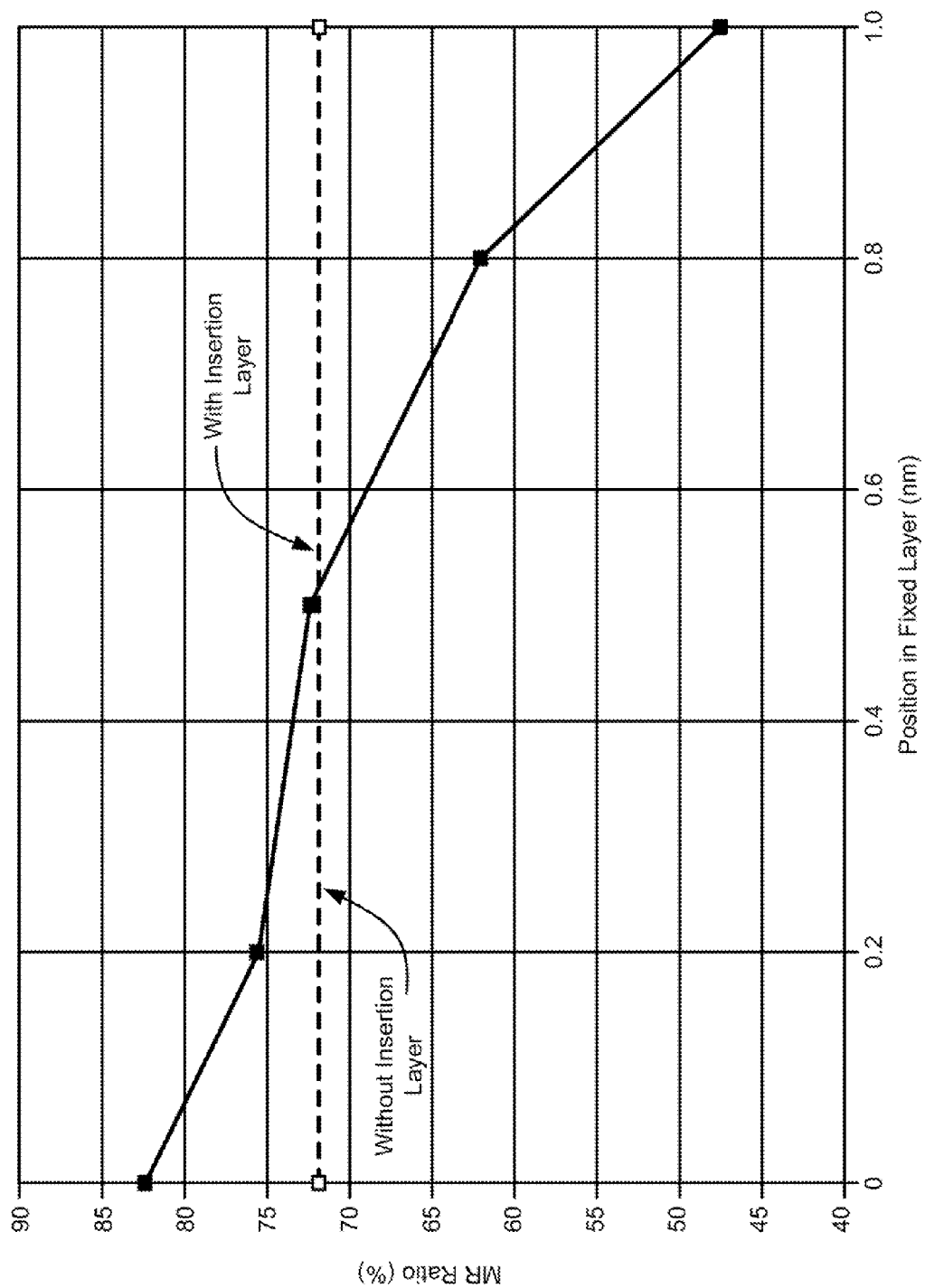
FIG. 4 shows a relationship between the Ta insertion layer position and the MR, according to one embodiment.

FIG. 4 shows a relationship between the Ta insertion layer position and the MR. In terms of position in FIG. 4, 0 corresponds to the bottom interface of the fixed layer (218, FIG. 2) with the second ferromagnetic layer (216, FIG. 2), and 10 corresponds to the top interface of the fixed layer (218, FIG. 2) with the third ferromagnetic layer (220, FIG. 2). Furthermore, in terms of the MR, the average of the data from each of the 5 points shown in FIG. 3 is plotted. As is clear from the results, the values thereof are greater than in the case where there was no insertion layer used. This is due to the fact that when the fixed layer (such as fixed layer 218, FIG. 2) comprises CoFeB and/or CoFeHf, and is grown on top of a crystallized CoFe layer (such as ferromagnetic layer 216, FIG. 2), the former is normally affected to a certain extent by the crystallinity of the underlying CoFe layer, so the CoFeB/CoFeHf grows as a crystallite. However, when a very thin insertion layer (such as insertion layer 230 comprising Ta, Ti, Hf, and/or Zr, FIG. 2) is inserted at some position between the two CoFe layers (such as second and third ferromagnetic layers 216, 220, FIG. 2), it is unlikely that any effect will be observed in the crystallinity, and the amorphous properties of the fixed layer may be further enhanced, rather than degraded. As the insertion position of the insertion layer (such as insertion layer 230, FIG. 2) becomes closer in proximity to the barrier layer (such as barrier layer 222, FIG. 2) side of the fixed layer, the MR ratio decreases, and it is only possible to obtain an MR ratio which is lower than in the case where there is no insertion layer used. This may be because if the insertion layer is too close to the barrier layer interface, the insertion layer material acts as an impurity, and the TMR effect is impeded.

Figure 5:
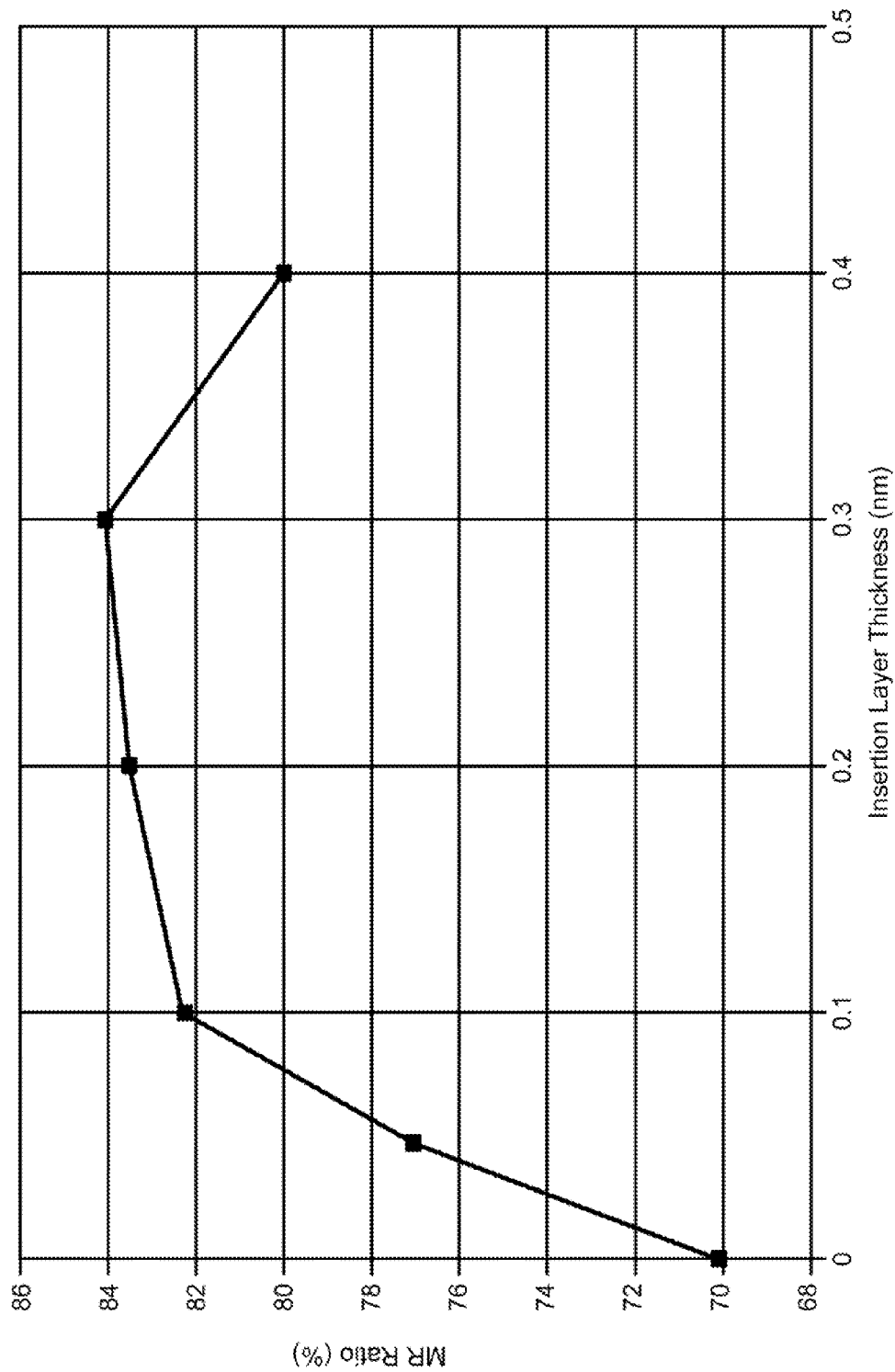
FIG. 5 shows changes in the MR when the insertion layer is fixed at the bottom interface of the fixed layer, and the thickness of the insertion layer is varied, according to one embodiment.

Furthermore, FIG. 5 shows changes in the MR when the same configuration is used, with the insertion layer fixed at the position of the bottom interface, except that the thickness of the insertion layer is varied. An effect is still apparent even when an insertion layer having a thickness of about 0.05 nm is inserted, and the MR is saturated at a thickness of about 0.1 nm. Accordingly, the insertion layer thickness is preferably no less than about 0.05 nm. Furthermore, there was no large reduction in the MR even when the thickness of the insertion layer was greater, e.g., greater than about 0.5 nm.

Figure 6:
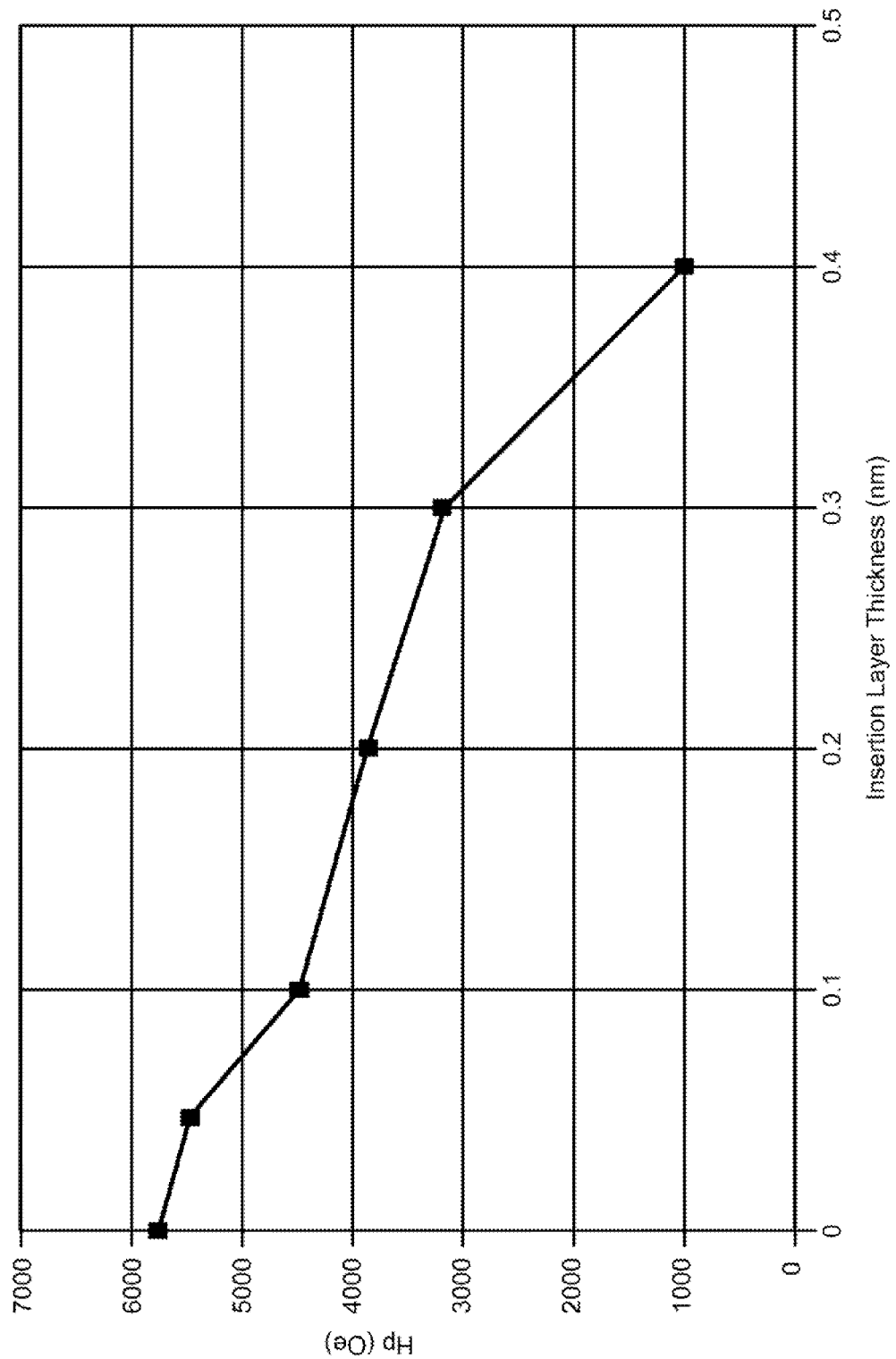
FIG. 6 shows insertion layer thickness dependence of the exchange coupling saturation magnetic field, Hp (Oe), in which the samples shown in FIG. 5 were measured.

On the other hand, when the insertion layer was excessively thick, the fixed layer (such as fixed layer 218, FIG. 2) and surrounding ferromagnetic layers (such as second and third ferromagnetic layers 216 and 220, FIG. 2) were magnetically divided, which is considered undesirable. FIG. 6 shows the insertion layer thickness dependence of the exchange coupling saturation magnetic field, Hp (Oe), in which the samples shown in FIG. 5 were measured by VSM. The exchange coupling magnetic field gradually decreased as a thicker insertion layer was inserted. When the insertion layer was thickened up to about 0.4 nm, there was a marked drop in exchange coupling through the Ru layer. This is believed to be because the ferromagnetic coupling of the CoFe layer and the CoFeB layer is divided by the insertion layer.

A suitable thickness range for the insertion layer, according to various embodiments, is in a range from about 0.05 nm to about 0.3 nm. As shown above, it is possible to increase the MR ratio by inserting an insertion layer of suitable thickness between a CoFeB layer above and a CoFe layer below. The descriptions provided herein in the exemplary embodiment include an insertion layer comprising Ta; however, the MR ratio may also be increased by the addition of an insertion layer comprising Ti, Hf, and/or Zr.

Referring again to FIG. 2, according to one embodiment, a TMR head 200 comprises a lead layer 204 above a substrate 202, a seed layer structure 232 above the lead layer 204, an AFM layer 210 above the seed layer structure 232, a first ferromagnetic layer 212 above the AFM layer 210, a second ferromagnetic layer 216 above the first ferromagnetic layer 212, a coupling layer 214 between the first and second ferromagnetic layers 212, 216, the coupling layer 214 causing a magnetization of the second ferromagnetic layer 216 to be coupled to a magnetization of the first ferromagnetic layer 212, a fixed layer 218 above the second ferromagnetic layer 216 (the TMR head may include a fixed layer 218 without the second ferromagnetic layer 216, in which case the coupling layer 214 causes a magnetization of the fixed layer 218 to be coupled to a magnetization of the first ferromagnetic layer 212), an optional third ferromagnetic layer 220 above the fixed layer 218, an insertion layer 230 adjacent to the fixed layer 218 or in the fixed layer 218, a barrier layer 222 above the fixed layer 218 and/or the third ferromagnetic layer 220, a free layer structure 234 comprising one or more layers above the barrier layer 222, and a cap layer 228 above the free layer structure 234. Of course, more or less layers may be present in the TMR head 200, according to various embodiments. For example, some of the described layers may be combined in some embodiments, additional layers may be included in the structure in more embodiments, etc.

In one embodiment, the lead layer 204 may include a stack of alternating layers of Cu and Ta above a NiFe underlayer having a total thickness of about 80 nm±50%. According to another embodiment, the seed layer structure 232 may include a layer of Ru 208 having a thickness of about 2.0 nm±50% above a layer of Ta 206 having a thickness of about 1.5 nm±50%.

In another approach, the AFM layer 210 may have a thickness of about 5.0 nm±50% and may include at least one of: MnIr and MnPt. According to another approach, the first ferromagnetic layer 212 may have a thickness of about 2.0 nm±50% and may include any ferromagnetic material, such as NiFe, CoFe, combinations thereof, etc.

According to another embodiment, the second ferromagnetic layer 216 and/or the third ferromagnetic layer 220 may each have a thickness of about 0.5 nm±50% and may include any ferromagnetic material, such as NiFe, CoFe, combinations thereof, etc.

In more embodiments, the coupling layer 214 may have a thickness in a range from about 0.4 nm to about 1.5 nm and may include any suitable material, such as Ru, Ir, Rh, Cr, Cu, Hf, combinations thereof, etc. In a further embodiment, the coupling layer 214 may have a thickness of about 0.8 nm and may include Ru.

According to more approaches, the fixed layer 218 may include an amorphous ferromagnetic material and may have a thickness of between about 0.5 nm and about 2.0 nm. In a further approach, the fixed layer 218 may have a thickness of about 1.0 nm±50%, an amorphous structure, and may include at least one of: CoFeB, CoFeHf, and the like.

In more embodiments, the insertion layer 230 may have a thickness in a range from about 0.05 nm to about 0.3 nm and may include any suitable material, such as Ta, Ti, Hf, Zr, combination thereof, and the like. In a further embodiment, the insertion layer 230 may have a thickness of about 0.1 nm±50% and may include Ta.

As previously stated, the insertion layer 230 may be positioned anywhere in the fixed layer 218 between the top and bottom sides of the fixed layer 218, or adjacent either side of the fixed layer 218, according to various embodiments. In one embodiment, the insertion layer 230 may be positioned between the fixed layer 218 and the second ferromagnetic layer 216. In another embodiment, the insertion layer 230 may be positioned in the fixed layer 218 at a position which is closer to the interface of the fixed layer 218 and the second ferromagnetic layer 216 than an interface of the fixed layer 218 and the third ferromagnetic layer 220. In another embodiment, the insertion layer 230 may be positioned in the fixed layer 218 at a position that is about equidistance from the interface of the fixed layer 218 and the second ferromagnetic layer 216 to the interface of the fixed layer 218 and the third ferromagnetic layer 220.

Of course, not all layers that are shown in FIG. 2 are necessary for the TMR head to operate and function. For example, in a TMR head which does not have a second ferromagnetic layer 216 or a third ferromagnetic layer 220, the insertion layer 230 may be positioned between the fixed layer 218 and the coupling layer 214, in one embodiment. In another embodiment, the insertion layer 230 may be positioned in the fixed layer 218 at a position that is closer to an interface of the fixed layer 218 and the coupling layer 214 than an interface of the fixed layer 218 and the barrier layer 222. According to yet another embodiment, the insertion layer 230 may be positioned in the fixed layer 218 at a position that is about equidistance from an interface of the fixed layer 218 and the coupling layer 214 to an interface of the fixed layer 218 and the barrier layer 222. Of course, other locations not explicitly described herein are possible for the interface layer 230, as would be understood by one of skill in the art upon reading the present descriptions.

In one approach, the barrier layer 222 may include MgO, $Al_2O_3$, or the like.

In another approach, the free layer structure 234 may include a ferromagnetic material and may have a thickness in a range from about 4.0 nm to about 8.0 nm. In a further approach, the free layer structure 234 may have a thickness of about 6.0 nm±50% and may include at least one of: CoFe, CoFeB, and CoFeHf.

According to another approach, the free layer structure 234 may include multiple layers, the multiple layers comprising a CoFeB layer 226 having a thickness of about 5.0 nm±50% above a CoFe layer 224 having a thickness of about 0.9 nm±50%.

Figure 7:
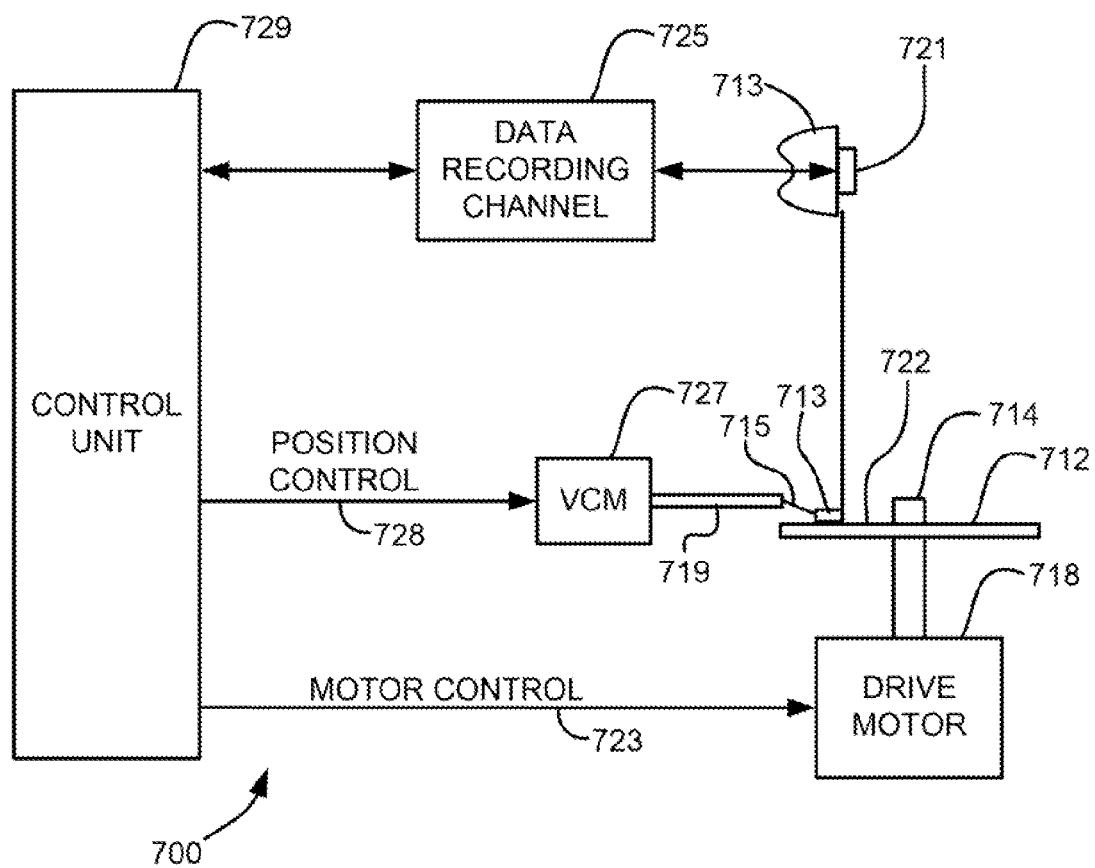
FIG. 7 shows a simplified schematic of a magnetic data storage system according to one embodiment.

Now referring to FIG. 7, a magnetic data storage system 700 is shown according to one embodiment. The magnetic data storage system 700 includes a magnetic medium 712, at least one magnetic head 721 using a TMR sensor film as described according to any embodiments herein for reading from/writing to the magnetic medium 712, a drive mechanism 718 for passing the magnetic medium 712 over the at least one magnetic head 721, and a controller 729 electrically coupled to the at least one magnetic head 721 for controlling operation of the at least one magnetic head 721.

Referring again to FIG. 7, there is shown a magnetic data storage system 700, such as a disk drive, in accordance with a more general embodiment. As shown in FIG. 7, at least one rotatable magnetic disk 712 is supported on a spindle 714 and rotated by a disk drive motor 718. The magnetic recording on each disk is typically in the form of an annular pattern of concentric data tracks (not shown) on the disk 712.

At least one slider 713 is positioned near the disk 712, each slider 713 supporting one or more magnetic read/write heads 721. As the disk rotates, slider 713 is moved radially in and out over disk surface 722 so that heads 721 may access different tracks of the disk where desired data are recorded and/or to be written. Each slider 713 is attached to an actuator arm 719 by means of a suspension 715. The suspension 715 provides a slight spring force which biases slider 713 against the disk surface 722. Each actuator arm 719 is attached to an actuator 727. The actuator 727 as shown in FIG. 7 may be a voice coil motor (VCM). The VCM comprises a coil movable within a fixed magnetic field, the direction and speed of the coil movements being controlled by the motor current signals supplied by controller 729.

During operation of the disk storage system, the rotation of disk 712 generates an air bearing between slider 713 and disk surface 722 which exerts an upward force or lift on the slider. The air bearing thus counter-balances the slight spring force of suspension 715 and supports slider 713 off and slightly above the disk surface by a small, substantially constant spacing during normal operation. Note that in some embodiments, the slider 713 may slide along the disk surface 722.

The various components of the disk storage system are controlled in operation by control signals generated by control unit 729, such as access control signals and internal clock signals. Typically, control unit 729 comprises logic control circuits, storage (e.g., memory), and a microprocessor. The control unit 729 generates control signals to control various system operations such as drive motor control signals on line 723 and head position and seek control signals on line 728. The control signals on line 728 provide the desired current profiles to optimally move and position slider 713 to the desired data track on disk 712. Read and write signals are communicated to and from read/write heads 721 by way of recording channel 725.

The above description of a typical magnetic disk storage system, and the accompanying illustration of FIG. 7 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tunnel magnetoresistance (TMR) head, comprising:
a lead layer above a substrate;
a seed layer above the lead layer;
an antiferromagnetic (AFM) layer above the seed layer;
a first ferromagnetic layer above the AFM layer;
a second ferromagnetic layer above the first ferromagnetic layer;
a coupling layer between the first and second ferromagnetic layers, the coupling layer causing a magnetization of the second ferromagnetic layer to be coupled to a magnetization of the first ferromagnetic layer;
a fixed layer above the second ferromagnetic layer;
an insertion layer in the fixed layer;
a barrier layer above the fixed layer;
a free layer above the barrier layer;
a cap layer above the free layer; and
a third ferromagnetic layer above the fixed layer and below the barrier layer, wherein the insertion layer is positioned in the fixed layer closer to an interface of the fixed layer and the second ferromagnetic layer than an interface of the fixed layer and the third ferromagnetic layer.

2. The TMR head as recited in claim 1, wherein the lead layer comprises a stack of alternating layers of Cu and Ta above a NiFe underlayer.

3. The TMR head as recited in claim 1, wherein the AFM layer comprises at least one of: MnIr and MnPt.

4. The TMR head as recited in claim 1, wherein the first and second ferromagnetic layers comprise at least one of: NiFe and CoFe.

5. The TMR head as recited in claim 1, wherein the second ferromagnetic layer is crystalline and has a thickness in a range from about 0.2 nm to about 1.0 nm.

6. The TMR head as recited in claim 1, further comprising a third ferromagnetic layer above the fixed layer and below the barrier layer, wherein the third ferromagnetic layer comprises at least one of: NiFe and CoFe.

7. The TMR head as recited in claim 1, wherein the coupling layer has a thickness in a range from about 0.4 nm to about 1.5 nm and comprises at least one of: Ru, Ir, Rh, Cr, Cu, and Hf.

8. The TMR head as recited in claim 1, wherein the fixed layer comprises an amorphous ferromagnetic material and has a thickness in a range from about 0.5 nm to about 2.0 nm.

9. The TMR head as recited in claim 8, wherein the fixed layer has an amorphous structure, and comprises at least one of: CoFeB and CoFeHf.

10. The TMR head as recited in claim 1, wherein the insertion layer has a thickness in a range from about 0.05 nm to about 0.3 nm and comprises at least one of: Ta, Ti, Hf, and Zr.

11. The TMR head as recited in claim 10, wherein the insertion layer comprises Ta.

12. The TMR head as recited in claim 1, wherein the free layer has a thickness in a range from about 4.0 nm to about 8.0 nm and comprises a ferromagnetic material selected from a group consisting of: CoFe, CoFeB, and CoFeHf.

13. A magnetic data storage system, comprising:
a magnetic medium;
at least one TMR head as recited in claim 1 for reading from/writing to the magnetic medium;
a drive mechanism for passing the magnetic medium over the at least one TMR head; and
a controller electrically coupled to the at least one TMR head for controlling operation of the at least one TMR head.

14. A tunnel magnetoresistance (TMR) head, comprising:
a lead layer above a substrate;
a seed layer above the lead layer;
an antiferromagnetic (AFM) layer above the seed layer;
a first ferromagnetic layer above the AFM layer;
a second ferromagnetic layer above the first ferromagnetic layer;
a coupling layer between the first and second ferromagnetic layers, the coupling layer causing a magnetization of the second ferromagnetic layer to be coupled to a magnetization of the first ferromagnetic layer;

a fixed layer above the second ferromagnetic layer;
an insertion layer in the fixed layer;
a barrier layer above the fixed layer;
a free layer above the barrier layer;
a cap layer above the free layer; and
a third ferromagnetic layer above the fixed layer and below the barrier layer, wherein the insertion layer is positioned in the fixed layer about equidistant from an interface of the fixed layer and the second ferromagnetic layer to an interface of the fixed layer and the third ferromagnetic layer.

* * * * *